UNITED STATES PATENT OFFICE.

CARLETON ELLIS, OF MONTCLAIR, NEW JERSEY, ASSIGNOR TO ELLIS FOSTER COMPANY, A CORPORATION OF NEW JERSEY.

FRUIT PRODUCT AND PROCESS OF MAKING.

1,068,047.      Specification of Letters Patent.      Patented July 22, 1913.

No Drawing.      Application filed April 13, 1912. Serial No. 690,497.

*To all whom it may concern:*

Be it known that I, CARLETON ELLIS, a citizen of the United States, and a resident of Montclair, in the county of Essex and State of New Jersey, have invented certain new and useful Improvements in Fruit Products and Processes of Making, of which the following is a specification.

This invention relates to a citrus product and the process of making same and relates to a solid product obtained from juices of citrus fruit, in particular, oranges and grape fruit, and to the process of making said product, and relates especially to the utilization of the large quantity of waste fruit, or culls, found in citrus growing sections, which have heretofore been of little value. The present invention utilizes these waste materials, yielding a product, preferably in a finely divided form, preferably in the form of flakes, or lamellæ, which preferably have a certain regulated degree of acidity and hygroscopicity.

The process involved herein comprises the stages of expressing the juices from the fruit pulp, preferably followed by clarification and sterilization, drying, and then preferably forming into the lamellar shape referred to above. The operation of expressing the fruit juices may be carried out by subjecting the whole fruit, such as oranges or grape fruit culls, to heavy pressure, or the skins may first be removed and the pulp subjected to the requisite pressure to remove the major portion of the juices. The extracted, or expressed juices may then be clarified, and if desired, the oily matter, coming from the skins or rind may be suitably separated. The tendency of the rind oils to oxidize and change the flavor of the material, makes it desirable to produce a juice of reduced oil content, or even one entirely free from oil, although a small proportion of the latter is sometimes desirable to augment the flavor. The clarified juice may be sterilized and this should take place at a relatively low temperature. For this purpose, I may make use of ultra violet light as described in my pending application, Serial No. 686,122. The acidity of the juice may be reduced prior to subjecting it to the evaporation process and for this purpose a small amount of carbonate, or bicarbonate of soda may be added. Finally the juices are treated by being heated under diminished pressure and at a substantially non-decomposing heat or temperature, so that a substantially moisture free permanent product is obtained without impairment of the natural fruit flavor. I preferably employ a vacuum which will allow removal of the moisture at a temperature of from 50 to 70 degrees C. In order to secure a lamellar product I preferably evaporate under diminished atmospheric pressure until at least one-half of the water has been expelled and then deliver the partially dried product on a hot, rotating drum in order to secure a flaky material. When hot, the drying material is rather sticky and the flakes would adhere to form a compact mass if immediately brought in contact one with another and I therefore preferably pass the lamellar product through a cooling and setting chamber before the flakes are mixed in a promiscuous manner. After the product has cooled and set it may be packaged for shipment.

It is sometimes difficult to dry the lamellæ on a rotating drum, and the operation may be carried out by partially drying on the drum in order to form the material into the desired shape and then passing the lamellæ through a drying apparatus, where the material is exposed to artificially dried air and in this way the temperature of the drying chamber may be kept well below that at which undesirable changes would take place in the lamellar product. The air may be dried by passing it over calcium chlorid or refrigeration may be employed for this purpose, the air subsequently being warmed to a temperature of 20 or 30 degrees before being brought into contact with the partially dried material. It is possible also to add to the expressed juice a quantity of sugar, starch, isinglass, or other thickening material to hasten the setting and enable the production of a firmer product.

Fruit from different sections of the country varies considerably in the proportion of juice present and solid extract contained, but the following will indicate the contents of juice obtained from oranges and grape fruit culls obtained from Florida: Orange pulp gave approximately 50% juice and the weight of the dried extract amounted to 5.2%. The over dried pulp amounted to 5.2% and the dried rind 5.3% of the total weight of the fruit. The extract dried at about 100° C. was brown and had a disagreeable burnt flavor, not at all resembling the flavor of the fresh pulp. The juice extracted from the grape fruit pulp amounted to 55% of the total fruit and the dried residue was 5.7% of the total weight. The oven dried pulp amounted to 4.7% and the dried rind 6.6% of the weight of the entire fruit. As in the case of orange extract, the extract from grape fruit was discolored by drying at about 100 degrees and the flavor was entirely unsatisfactory. On drying under diminished atmospheric pressure and forming into thin flakes a readily soluble, difficulty caking material of good flavor was produced.

The extract obtained as above, may be mixed with cereal or other food stuff and dried to form a cereal flake containing fruit sugar and fruit flavoring material, or flake cereal, or other variety of cereal may be mixed with the lamellar fruit extract to form a food stuff. A mixture may be made by taking from 80% to 90% of flaked cereal and incorporating from 20% to 10% of the flaked fruit juices.

By drying the product by means of refrigerated air or air treated in other ways, the fruit flavor may sometimes be slightly impaired by oxidation, especially if the temperature is raised above 30–40° C., and in place of air, an inert gas, such as carbon dioxid or nitrogen may be employed such gases being used over and over again by being caused to travel in a cyclic path through the air drying chamber and then through the extract drying apparatus. Or if air is used it is preferable to use the same body thereof repeatedly, so that it may become charged with the volatile incondensable portions which may come from the fruit juices during the drying operation; the re-use of such air reducing the tendency of oxidation or change in flavor.

In combining such fruit juices with cereal material, it is sometimes desirable to have the acidity of the dried extract rather low and to this end, neutralization, as set forth above may be employed. The degree of the acidity of the juice should first be ascertained and a harmless alkali, such as carbonate of soda added in an amount sufficient to reduce the acidity to one-half its normal amount, or to any other desired degree.

What I claim is:—

1. The process of making dried citrus fruit extract from culls, which consists in expressing the juice thereof, clarifying, sterilizing, partially neutralizing, removing at least one-half of the moisture therefrom under diminished pressure, and removing substantially the remaining moisture by evaporating the residue in thin layers whereby the dried extract is obtained in a lamellar form.

2. The process of making dried citrus fruit extract from culls, which comprises expressing the major portion of the juices thereof, removing at least one-half of the moisture therefrom under diminished atmospheric pressure and in removing substantially the remaining moisture by evaporating the residue in thin layers.

3. The process of making dried citrus fruit extract from culls, which comprises expressing the major portion of the juices therefrom, removing at least one-half of the moisture at a relatively low temperature under diminished atmospheric pressure and removing substantially the remaining moisture by evaporating the residue in thin layers by contact with dried air.

4. As a new article of manufacture the sterile, partially dry neutralized, water soluble portions of citrus juices in a lamellar form.

5. As a new article of manufacture the sterile, partially neutralized water soluble, solid portions of citrus juices in a lamellar form, substantially free from moisture and retaining substantially the flavor of the original fruit juices.

6. As a new article of manufacture, the sterile, water soluble solid portion of citrus fruit juices in a flaky form, substantially free from moisture and retaining substantially the flavor of the original fruit juices.

7. As a new article of manufacture, a sterile, substantially water soluble extract of citrus juices in a flaky form substantially free from moisture and retaining substantially the flavor of the original fruit juices.

8. As a new article of manufacture a substantially water soluble extract of citrus juices in substantially a flaky form substantially free from moisture and retaining substantially the flavor of the original fruit juices.

Signed at Montclair in the county of Essex and State of New Jersey this 6th day of April A. D. 1912.

CARLETON ELLIS.

Witnesses:
 BIRDELLA M. ELLIS,
 J. OLIVE HAWTHORN.